US012677334B2

(12) United States Patent
Colom Ikuno

(10) Patent No.: US 12,677,334 B2
(45) Date of Patent: Jul. 7, 2026

(54) DEPLOYMENT OF EDGE APPLICATION ON A USER EQUIPMENT IN A TELECOMMUNICATIONS SYSTEM

(71) Applicant: Deutsche Telekom AG, Bonn (DE)

(72) Inventor: Josep Colom Ikuno, Korneuburg (AT)

(73) Assignee: DEUTSCHE TELEKOM AG, Bonn (DE)

( * ) Notice: Subject to any disclaimer, the term of this patent is extended or adjusted under 35 U.S.C. 154(b) by 323 days.

(21) Appl. No.: 18/574,379

(22) PCT Filed: Jun. 23, 2022

(86) PCT No.: PCT/EP2022/067152
§ 371 (c)(1),
(2) Date: Dec. 27, 2023

(87) PCT Pub. No.: WO2023/274830
PCT Pub. Date: Jan. 5, 2023

(65) Prior Publication Data
US 2024/0314861 A1      Sep. 19, 2024

(30) Foreign Application Priority Data

Jul. 1, 2021     (EP) ..................................... 21183195

(51) Int. Cl.
*H04W 76/12*            (2018.01)
(52) U.S. Cl.
CPC ................................... *H04W 76/12* (2018.02)
(58) Field of Classification Search
CPC .................................................... H04W 76/12

(Continued)

(56) References Cited

U.S. PATENT DOCUMENTS

2022/0086218 A1* 3/2022 Sabella ................. H04M 15/66

OTHER PUBLICATIONS

Huawei et al., "Pseudo-CR on Update deployment scenarios with applicable conditions", 3GPP Draft; S6-192000, WAS1844WAS1902WAS1724, Update Delopyment Scanerios With Applicable Conditions, 3rd Generation Partnership Project (3GPP), Mobile Competence Centre, Sep. 8, 2019 (Sep. 8, 2019); pp. 1-3, vol. {0} SA WG6, No. {0} Sophia Antipolis, France; Sep. 2, 2019-Sep. 6, 2019, 650, Route Des Lucioles; Retrieved from the Internet: URL: http://www.3gpp.org/ftp/tsg_sa/WG6_MissionCritical/TSGS6_033_Sophia_Antipolis/Docs/S6-192000.zip, XP051780046, [retrieved on Sep. 8, 2019].

(Continued)

*Primary Examiner* — Christopher R Crompton
(74) *Attorney, Agent, or Firm* — Leydig, Voit & Mayer, Ltd.

(57) ABSTRACT

A telecommunications system includes: a user equipment (UE); an access network (AN); a core network (CN); and one or more data networks (DNS). The UE comprises: a UE layer (UEL); an application layer (AL); one or more edge application instances (EAIs); an EAI layer (EAIL); and an application. The RAN is configured to provide the UE access to the CN, the CN being configured to provide connectivity to the one or more DNs via protocol data unit (PDU) session(s), each PDU session providing access to a respective DN. The UEL is configured to direct traffic within a PDU session towards the AL and/or the RAN. The AL is configured to: communicate with the UEL; expose a PDU session to the application and/or the EAIL via a PDU session endpoint; and resolve a service address and/or a service name to the EAIL and/or an EAI.

20 Claims, 6 Drawing Sheets

(58) Field of Classification Search
USPC ........................................................ 370/328
See application file for complete search history.

(56) References Cited

OTHER PUBLICATIONS

LG Electronics et al, "KI#2: New Sol: Supporting application server change based on AF notification", 3rd Generation Partnership Project (3GPP), Mobile Competence Centre; May 22, 2020 (May 22, 2020), pp. 1-4, vol. {0 } SA WG2, No. {0} Electronic, Elbonia; Jun. 1, 2020-Jun. 12, 2020, 3GPP Draft; S2-2003842, 650, Route Des Lucioles; F-06921 Sophia-Antipolis Cedex; France, Retrieved from Internet: URL: https://ftp.3gpp.org/tsg_sa/WG2_Arch/TSGS2_139e_Electronic/Docs/S2-2003842.zip S2-2003842 (revision of S2-2000387)_enh_EC_solution for KI2.doc, XP051889853, [retrieved on May 22, 2020].
Lenovo et al, "KI#2, Conclusion update on UE DNS cache", 3GPP Draft; S2-2008919, 3rd Generation Partnership Project (3GPP), Mobile Competence Centre; Nov. 9, 2020 (Nov. 9, 2020), pp. 1-3, vol. {0} SA WG2, No. {0} Elbonia; Nov. 16, 2020-Nov. 20, 2020, 650, Route Des Lucioles; F-06921 Sophia-Antipolis Cedex; France, Retrieved from the Internet: URL: https://ftp.3gpp.org/tsg_sa/WG2_Arch/TSGS2_142e_Electronic/Docs/S2-2008919.zip S2-2008919 KI#2 Update on Conclusion UE cache.docx, XP051953235 [retrieved on Nov. 9, 2020].

* cited by examiner

PDU session

DEPLOYMENT OF EDGE APPLICATION ON A USER EQUIPMENT IN A TELECOMMUNICATIONS SYSTEM

CROSS-REFERENCE TO PRIOR APPLICATIONS

This application is a U.S. National Phase application under 35 U.S.C. § 371 of International Application No. PCT/EP2022/067152, filed on Jun. 23, 2022, and claims benefit to European Patent Application No. EP 21183195.3, filed on Jul. 1, 2021. The International Application was published in English on Jan. 5, 2023 as WO 2023/274830 A1 under PCT Article 21(2).

FIELD

The present invention relates to a method for deployment of edge application on a user equipment (UE) in a telecommunications system and a telecommunications system thereof.

BACKGROUND

In the current 5G system a mobile network is typically divided in two main parts: access network (AN) and core network (CN). FIG. 1 shows an exemplary 5G system comprising a UE 10, a radio access network 20 (RAN), a CN 30 and a data network 40 (DN), such as for example the Internet, identified via a DN name (DNN).

The main objective of a mobile network is to provide the UE with connectivity towards a DN. Currently, to do so, the UE communicates with the RAN via a radio interface, which is used for conveying both signaling information and data traffic. In more detail, even in the case where there is a logical separation (logical channels), both types of data are transmitted over the same physical medium.

Between the RAN and the CN, signaling information and user data are separated in different interfaces: N1/N2 and N3 in the 5G case, the former running on a SCTP/NG-AP/NAS protocol stack and the latter running on a UDP/GTPU-U protocol stack. This is shown in FIG. 2, which illustrates an exemplary data transmission between the UE 10 and the DN 40.

In FIG. 2, the UE 10 is connected through the Uu interface to the gNB at the RAN. The gNB is connected, on the control plane, to the access and mobility management function (AMF) of the CN 30 via the N1/N2 interface. Further, on the user plane, the gNB is connected to the user plane function (UPF) via the N3 interface. The UPF is connected to the DN 40, on the user plane, via the N6 interface.

In order to establish a data connection for enabling a UE to communicate with a DN, a PDU session is required. A PDU session is a logical data transport channel terminated at the CN that provides connectivity to a DN. The termination point of a given PDU session (UPF in the case of FIG. 2 and how it works in 5G) is referred to as PDU session anchor (PSA). A PDU session has one or more associated QoS (several QoS flows can be contained within the PDU session).

While a UE moves (e.g. handover), the PSA is typically expected to remain constant (hence the term "anchor").

FIG. 3 illustrates an example of the PDU session establishment process according to the 3GPP. As shown in FIG. 3, PDU session establishment is performed by the UE 10 via the radio interface. The RAN 20 is aware of PDU sessions because it needs the information to, for example, do physical resource allocation on Uu, but the PDU session is managed by the CN 30.

In FIG. 3, the UE sends (S1) a PDU session establishment request to the AMF through the gNB, via the Uu and N1/N2 interfaces (see FIG. 2).

The AMF triggers the UPF by communicating with the SMF (S2A) to establish a N3 data path between the gNB and the UPF. The exchange of messages may involve other network functions (NFs) (e.g. session management function (SMF), policy control function (PCF)). Then, the AMF exchanges messages (S2B) with the gNB to establish a N3 data path between the gNB and the UPF.

The AMF sends (S3) a PDU session establishment response to the UE 1 via the gNB.

Lastly, data traffic is: exchanged (S4A) between the UE 1 and gNB via the Uu interface (radio); exchanged (S4B) between the gNB and the UPF via the N3 interface (GTP-U tunnel); and exchanged (S4C) between the UPF and the DN 40 via the N6 interface (unencapsulated).

Currently, distinct PDU sessions are regarded as independent, i.e. a PDU session establishment is not linked to other PDU session establishment requests.

Besides, currently standardized (for example, in 3GPP Release 16 TS 23.501, Release 17 TS 23.548) is that edge functionality enables connectivity by placing the DN in CN locations closer to the UE.

FIG. 4 illustrates an example scenario of the current edge application deployment. In FIG. 4, an edge application instance (EAI) 31, also referred to as edge application server (EAS) in 3GPP standards, is accessed via a DN 40 placed closer to the gNB. Current methods for accessing edge applications involves the use of several PSAs, depending on the target service's address. For example, TS 23.501 defines the concept of uplink classifier (UL-CL), which is used to offload edge traffic towards the edge PSA.

Mechanisms to realize the traffic offloading at the RAN level exist with similar concepts (in this case, the traffic would not be directed via N3 towards the CN but rather directly exit at the RAN). From the perspective of an application running at the UE, connectivity is provided via an exposed network interface (for example, IP/Ethernet interface), common in existing operating system (OS).

Consequently, besides using a specific network interface. Each PDU session is typically exposed as a different network interface towards higher layers in the UE. The application is generally not aware of how a packet arrives to its intended destination.

FIG. 5 illustrates an example flow-chart for sending a packet from an application residing at a UE towards a EAI. In FIG. 6, the application 11 sends data packet A over the network interface to the operating system 12 (OS), which forwards the packet A to the UE 10 via OS-UE interfaces such as, for example, a modem interface. Thus, the OS and the modem are considered to provide different layers. While the OS is the layer on which applications are deployed/run, the modem provides a connectivity layer based on e.g. 5G standards. Thereafter, the UE 10 sends the packet A to the RAN 20 with Uu encapsulation, i.e. via the Uu interface, over a PDU Session. The RAN 20 sends the packet A to the CN 30 with N3 encapsulation over the PDU Session. Finally, the CN 30 sends the packet A to the edge application instance backend 41 (EAI).

This behavior is desirable, as requiring the application to have detailed awareness of the underlying layers introduces unnecessary complexity to the application. Either the application uses a specific network interface for communication or the interface is chosen by the operating system (OS) based on commonly used functionality (e.g. routing tables based on the destination IP address of sent packets).

In virtualized environments, an infrastructure layer provides both a runtime where virtualized applications can be run on (for example "Docker" or "KVM") and network connectivity (for example "vSwitch").

Typical virtualized applications, especially telecommunications applications, can require connections to several networks, which are exposed within the application as network interfaces. This can provide logical traffic separation and/or easier traffic prioritization for the lower layers providing the connectivity. In other words, this enables the infrastructure layer remain application-agnostic.

Deploying an edge application on the UE requires not only the capability to run the application but also the capability of providing said application with network connectivity, i.e. the connectivity backhaul.

However, according to conventional technology, a virtualized application is not able or allowed to set up its own networks because it would not be safe. Rather, as part of the application deployment a virtualized application is provided with network connectivity as pre-established in a template and/or configuration used for the deployment.

Thus, currently, there is no possibility to deploy application functionality (either application or network functionality such as packet processing) on the UE in a way that it is transparent to the applications behind it, as well as providing connectivity to said application functionality.

Further, it is currently not possible to enable the networks to deploy edge functionality at the UE.

Further, it is currently not possible to allow applications communicate with or via said functionality transparently. Two cases can be differentiated here: 1) if the application is the target of the communication (for example a server-like application exposing an API some other application accesses via IP); or 2) if the application is transparent to the traffic (for example a traffic shaping/manipulation application.

SUMMARY

In an exemplary embodiment, the present invention provides a telecommunications system. The telecommunications system comprises: a user equipment (UE); an access network (AN); a core network (CN); and one or more data networks (DNS). The UE comprises: a UE layer (UEL); an application layer (AL); one or more edge application instances (EAIs); an EAI layer (EAIL); and an application. The RAN is configured to provide the UE access to the CN, the CN being configured to provide connectivity to the one or more DNs via protocol data unit (PDU) session(s), each PDU session providing access to a respective DN. The UEL is configured to direct traffic within a PDU session towards the AL and/or the RAN. The AL is configured to: communicate with the UEL; expose a PDU session to the application and/or the EAIL via a PDU session endpoint; resolve a service address and/or a service name to the EAIL and/or an EAI; and direct traffic from/to a PDU session endpoint to another PDU session endpoint based on the resolved service address and/or service name. The EAIL is configured to: communicate with the AL; resolve a service address and/or a service name to an EAI; and direct traffic to/from a corresponding EAI based on the resolved service address and/or service name. The EAIs are configured to communicate with the EAIL. The application is configured to:

communicate with the AL; and communicate with the service address and/or service name of the EAI.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
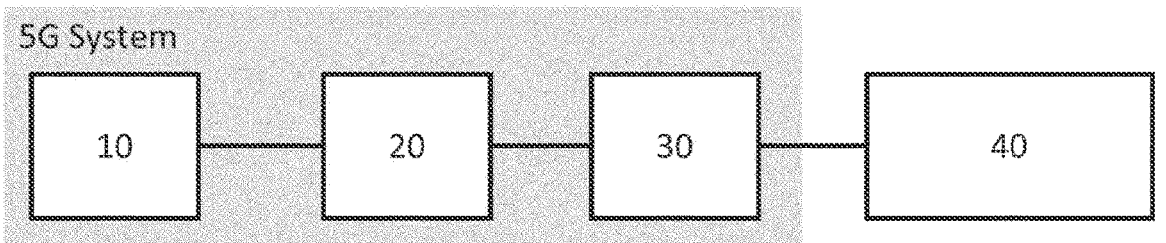
FIG. 1 illustrates an exemplary 5G system.
Figure 2:
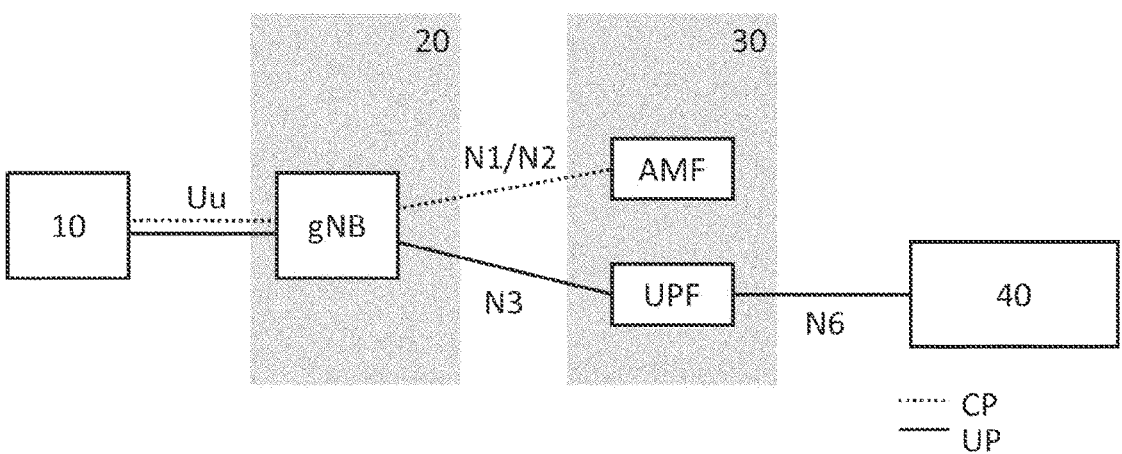
FIG. 2 illustrates an exemplary data transmission between UE and DN.

According to an aspect of the invention, there is provided a telecommunications system comprising: a user equipment (UE); an access network (AN); a core network (CN); and one or more data networks (DNs), wherein the UE comprises: a UE layer (UEL); an application layer (AL); one or more edge application instances (EAIs); an EAI layer (EAIL); and an application, wherein: the RAN is configured to provide the UE access to a CN, the CN being configured to provide connectivity to the one or more DNs via protocol data unit (PDU) session/s, each PDU session providing access to a DN, the UEL is configured to: direct traffic within a PDU session towards the AL and/or the RAN; the AL is configured to: communicate with the UEL; expose a PDU session to the application and/or the EAIL via a PDU session endpoint; resolve a service address and/or a service name to the EAIL and/or a EAI; and direct traffic from/to a PDU session endpoint to another PDU session endpoint based on the resolved service address and/or service name, the EAIL is configured to: communicate with the AL; resolve a service address and/or a service name to a EAI; and direct traffic to/from a corresponding EAI based on the resolved service address and/or service name, the EAIs are configured to communicate with the EAIL, the application is configured to: communicate with the AL; and communicate with the service address and/or service name of the EAI.

According to another aspect of the invention, there is provided a telecommunications system comprising: a user equipment (UE); an access network (AN); a core network (CN); and one or more data networks (DNS), wherein the UE comprises: a UE layer (UEL); an application layer (AL); one or more edge application instances (EAIs); an EAI layer (EAIL); and an application, wherein: the RAN is configured to provide the UE access to the CN, the CN being configured to provide connectivity to the one or more DNS via protocol data unit (PDU) session/s, each PDU session providing access to a DN, the UEL is configured to: direct traffic within a PDU session towards the AL and/or the RAN, resolve a service address and/or a service name to the EAIL and/or a EAI; and direct traffic from/to a PDU session endpoint and EAIL based on the resolved service address and/or service name, the AL is configured to: communicate with the UEL; and expose a PDU session to the application via another PDU session endpoint, the EAIL is configured to: commu- nicate with the UEL; resolve a service address and/or a service name to the EAI; and direct traffic to/from a corre- sponding EAI based on the resolved service address and/or service name, the EAI is configured to communicate with the EAIL, the application is configured to: communicate with the AL; and communicate with the service address and/or service name of the EAI.

According to a preferred aspect, the system may further comprise a EAI backend, wherein the one or more EAI and/or EAIL is configured to communicate with a EAI backend via the CN via one or more DNs, wherein: the CN is configured to: send the UE a trigger message to initiate one or more backhaul PDU session establishments exposed to an EAI and/or EAIL or, send the UE a trigger to use an existing backhaul PDU session; and provide the EAI and/or connectivity to the EAI backend, wherein the trigger mes- sage comprises one or more of: data network name (DNN) for the PDU session; slice identifier for the PDU session; credentials to be used for the PDU session establishment; and/or an identifier of the EAI and/or EAIL related to the backhaul PDU session belongs to.

According to a preferred aspect, an access to the backhaul PDU sessions by the AL, other applications and/or other EAIs may be restricted by the UEL.

According to a preferred aspect, in the case when a backhaul PDU session is used by several EAIs: the UEL or EAIL may be configured to direct the data traffic between EAIs using said backhaul PDU session within the UE.

According to a preferred aspect, the CN may be config- ured to manage network address allocation for EAIs related to a given backhaul PDU session.

According to a preferred aspect, the UE may be config- ured to send, to the CN, information related to data being exchanged between the application and the EAI via a backhaul PDU session.

According to a preferred aspect, the UE may be config- ured to forward data exchanged between the application and EAIs towards the CN via a backhaul PDU session.

According to a preferred aspect, the UE may be config- ured to: register to the CN via the RAN; and inform the CN about the capabilities of its EAIL.

According to a preferred aspect, the routing of the packets between the application and the EAIs may be steered by the CN, which is configured to instruct the UE to set a URSP rule to divert traffic directed to the EAI service address and/or service name to a local endpoint referencing the EAI and/or EAIL located at the UE.

According to a preferred aspect, the UE may be config- ured to use an EAI identifier identifying a EAI, for estab- lishing a PDU session, to link PDU session/s and a given EAI.

According to a preferred aspect, the UE may be config- ured to indicate when requesting a PDU session that the PDU session is used for communication between EAI and EAI backend.

According to a preferred aspect, the system may further comprise a EAI backend, wherein the EAI and/or EAIL is configured to communicate with a EAI backend via the CN via one or more PDU sessions or PDU session endpoints.

According to a preferred aspect, PDU sessions used for communication between the one or more EAIs and the EAI backend assigned a group identifier, ID, and optionally, a priority indication within the PDU session group, wherein the PDU session group ID is shared by several PDU sessions and indicates that said PDU sessions need to be treated jointly.

According to a preferred aspect, the CN may be config- ured to send a PDU session confirmation message to the UE comprising a priority identifier identifying, within a given PDU session group, the priority of a given PDU session.

According to a preferred aspect, the AL and EAIL may be located on different physical devices and/or run on different processors.

According to another aspect of the invention, there is provided a method for deployment of edge applications in a telecommunications system comprising: a user equipment (UE); an access network (AN); a core network (CN); and one or more data networks (DNs), wherein the UE com- prises: a UE layer (UEL); an application layer (AL); one or more edge application instances (EAIs); an EAI layer (EAIL); and an application, the method comprising: provid- ing, by the RAN to the UE, access to the CN, the CN providing connectivity to the one or more DNs via protocol data unit (PDU) session/s, each PDU session providing access to a DN; directing, by the UEL, traffic within a PDU session towards the AL and/or the RAN; communicating, by the AL, with the UEL; exposing, by the AL, a PDU session to the application and/or he EAIL via a PDU session endpoint; resolving, by the AL, a service address and/or a service name to the EAIL and/or a EAI; directing, by the AL, traffic from/to a PDU session endpoint to another PDU session endpoint based on the resolved service address and/or service name; communicating, by the EAIL, with the AL; resolving, by the EAIL, a service address and/or a service name to a EAI; directing, by the EAIL, traffic to/from a corresponding EAI based on the resolved service address and/or service name; communicating, by the EAIs, with the EAIL, communicating, by the application, with the AL; and communicating, by the application, with the service address and/or service name of the EAI.

According to another aspect of the invention, there is provided a method for deployment of edge applications in a telecommunications system telecommunications system comprising: a user equipment (UE); an access network (AN); a core network (CN); and one or more data networks (DNS), wherein the UE comprises: a UE layer (UEL); an application layer (AL); one or more edge application instances (EAIs); an EAI layer (EAIL); and an application, the method comprising: providing, by the RAN, the UE access to the CN, the CN providing connectivity to the one or more DNs via protocol data unit (PDU) session/s, each PDU session providing access to a DN; directing, by the UEL, traffic within a PDU session towards the AL and/or the RAN, resolving, by the UEL, a service address and/or a service name to the EAIL and/or a EAI; and directing, by the UEL, traffic from/to a PDU session endpoint and EAIL based on the resolved service address and/or service name; communicating, by the AL, with the UEL; exposing, by the AL, a PDU session to the application via another PDU session endpoint; communicating, by the EAIL, with the UEL; resolving, by the EAIL, a service address and/or a service name to the EAI; directing, by the EAIL, traffic to/from a corresponding EAI based on the resolved service address and/or service name; communicating, by the EAI, with the EAIL, communicating, by the application, with the AL; and communicating, by the application, with the service address and/or service name of the EAI.

Other aspects, features, and advantages will be apparent from the summary above, as well as from the description that follows, including the figures and the claims.

The present disclosure presents two example embodiments below.

In a first embodiment of the disclosure, a first alternative comprises deploying an edge application instance on the UE, UE's application layer (AL), for example as part of Android/IOS. In this case, the edge application instance (EAI) is, from the point of view of the UE layer (UEL), an application.

While the AL provides and supports the applications, e.g. as an application runtime or application OS, the UAL provides connectivity, e.g. a UE software stack/modem based on 5G standards. Implementation-wise, no restriction is placed on whether the AL and UEL need to reside on the same physical device and/or run on the same processor. It is also possible to split the UE in several physical parts. A UE split this layer separation can be applied to is the functional split of the UE into a mobile equipment (ME) and a terminal equipment (TE), whereas the AL may be placed in the ME and the UAL in the TE.

In a second embodiment of the disclosure, a second alternative comprises deploying the UE edge application as part of the UEL and managed by the network.

Figure 6:
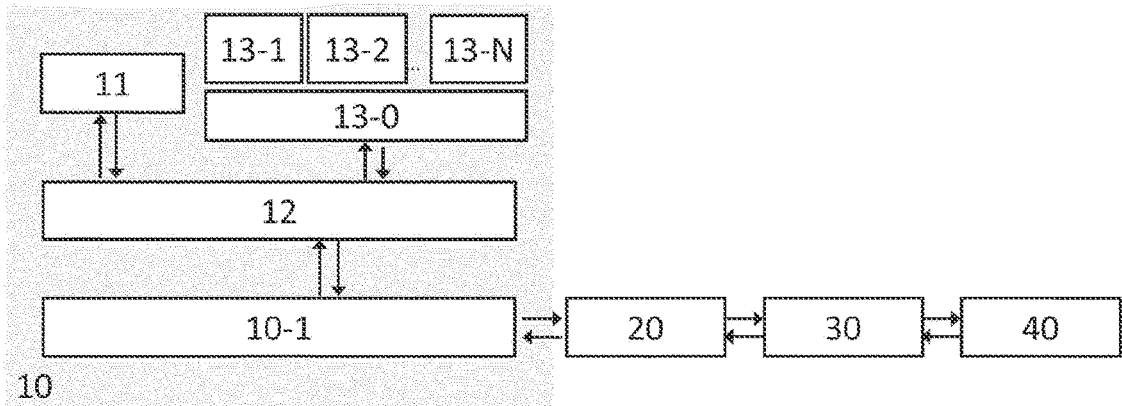
FIG. 6 illustrates an EAI running on an OS according to an embodiment of the invention.
Figure 7:
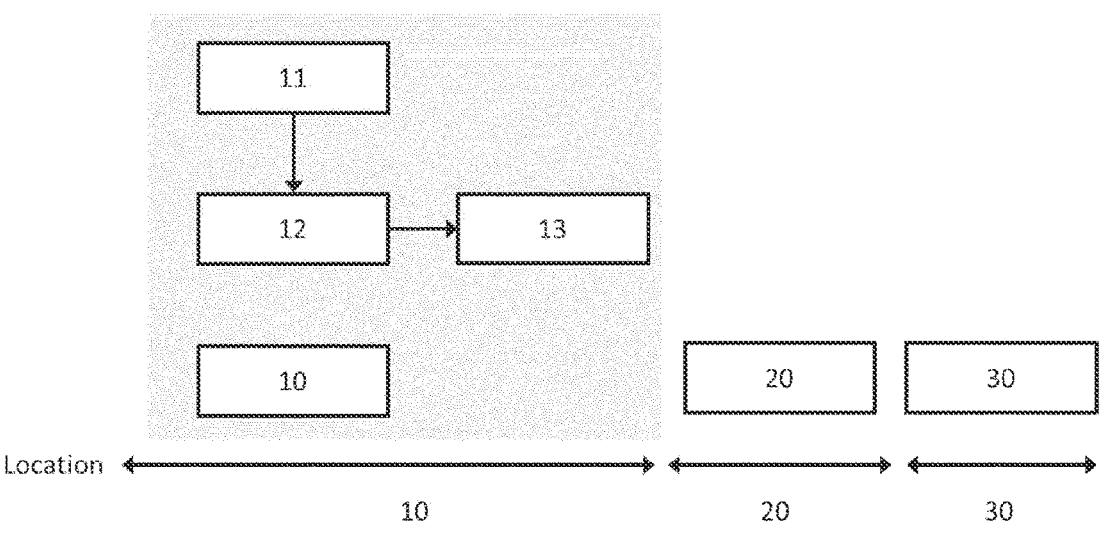
FIG. 7 illustrates the communication flow between an application and an EAI according to an embodiment of the invention.

FIG. 6 illustrates an EAI running on/communicating with an application layer (AL) according to the first embodiment of the disclosure. In FIG. 6, the UE 10 comprises an application 11, an AL 12, one or more EAIs 13-1, 13-2, 13-N, and a UE layer (UEL) 10-1. In this case, the EAI layer (EAIL) 13-0 on which the EAI(s) run(s) on or communicates with, e.g. a virtualization layer or container runtime, is managed by the application layer 12. FIG. 7 illustrates the communication flow between an application 11 and an EAI 13 deployed in such a way.

In FIG. 7, the application 11 sends a data packet A over the network interface to the AL 12. Any traffic to the EAI 13 will remain in the UE 10. This means that the packet A that remains in the UE 10 is transparent to the application. In other words, the UEL 10-1 is not involved.

Typically, an application resolves (for example via domain name system (DNS)) the service name to an address to which traffic is sent. Thus, in order to ensure that the traffic is not routed by the AL 12 to (typically) the internet DNN, the AL 12 needs to be aware that the EAI's service name and/or address is to be routed locally and not sent towards the PDU session.

For that, the solution requires that either 1) that a configuration entry is present in the AL 12 so that traffic to the network address of the EAI 13 is routed locally, or 2) that a configuration entry is present in the AL 12 so that service name resolution requests (such as DNS) targeting the EAI's service name are resolved to the EAI's network address.

The IP addressing of the EAI 13 is managed by the EAI 13, so it is the responsibility of the OS 12 to either route packets towards the EAI's network address to the EAI, instead of towards the RAN/CN/DN, and/or resolve the EAI's service name to the EAI's network address.

Figure 8:
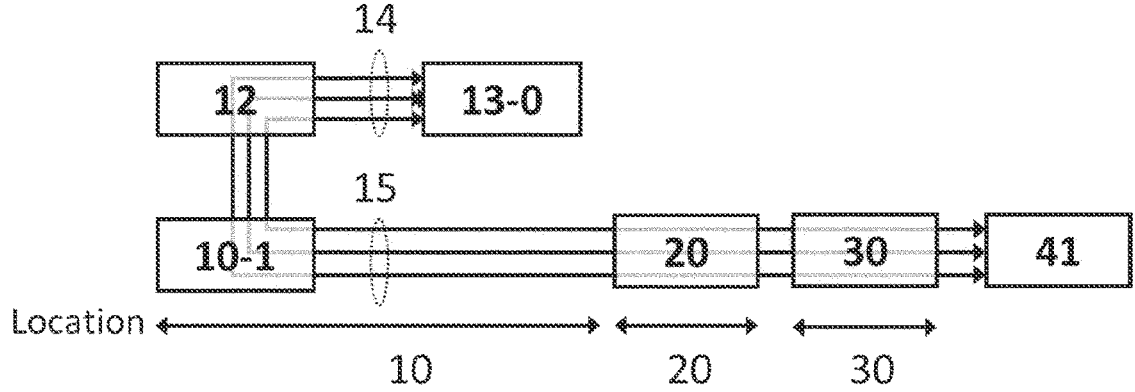
FIG. 8 illustrates an edge application backhaul according to an embodiment of the present invention.

FIG. 8 illustrates an edge application backhaul according to an embodiment of the present invention. According to this embodiment, communication between the EAI 13-0 and an EAI application backend 41 occurs without involvement of the UEL 10-1. PDU sessions 15 used for EAI backhaul are, from UEL 10-1 perspective, not discernible from other PDU sessions. Here, the AL communicates with the UEL 10-1 by exposing a PDU session to the application 11 and/or the EAIL 13-0 via a PDU session endpoint 14.

Besides, in this case, the EAI 13 is not aware that the service to which it communicates with is located in the UE 10 (for example, the address service-name.operator.com is not supposed to be a localhost).

Figure 10:
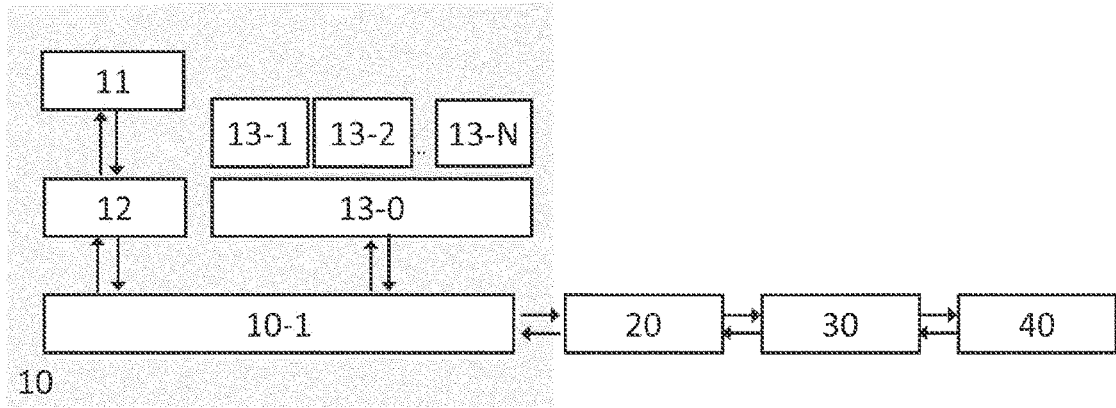
FIG. 10 illustrates an EAI managed by the network according to an embodiment of the invention.

In addition to the above-mentioned configurations as described for FIG. 10, when the UE 10 performs the PDU session establishment the UE 10, the PDU session establishment request needs to further comprise: an indication that a given PDU session is used for backhauling and information indicating that the grouping of the PDU sessions used for backhauling for a specific EAI.

Advantageously, this allows 5GS components such as the RAN 20 and the CN 30 to be aware that a PDU session (regardless of the QoS level requested, i.e. latency, packet loss) is used for backhauling. In addition, this also allows that when managing several PDU sessions, to treat them as a group that belongs together or that needs to be treated jointly. In typical applications, if one of the networks breaks, the application connectivity is irretrievable broken. Thus, the networks should take this information into consideration such as, for example, when terminating PDU session(s) from network-side.

PDU session grouping also allow applications requiring different QoS flows and connectivity to different DNNs (within one DNN, one can use QoS flows within a PDU session) to group PDU sessions as well as enabling the introduction of hierarchy within PDU session groups if desired.

To synthetize the above described modifications, the additions required to the current PDU session establishment process, as described above with reference to FIG. 3, are the following ones.

The PDU session establishment request needs to further comprise the following information: an indication that the PDU session is a grouped PDU session, and/or a PDU session group ID or a request of a new PDU session group ID. The PDU session group ID may be used to steer session management function (SMF) selection (when the group is managed by the same SMF) and/or user plane function (UPF) selection.

Optionally, the CN sends a PDU session confirmation message to the UE. The confirmation message may comprise a priority identifier identifying, within a given PDU session group, the priority of a given PDU session.

Advantageously, it would be possible to enable the functionality for operating on a PDU session group (e.g. session release).

Figure 9:
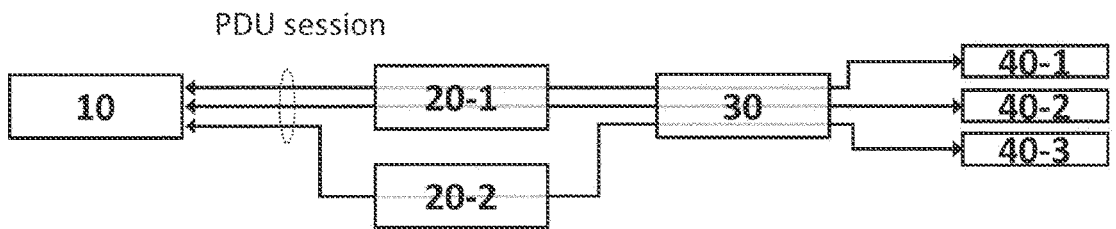
FIG. 9 illustrates, from a generic perspective, how grouped PDU sessions are seen by the 5GS according to an embodiment of the present invention.

FIG. 9 illustrates, from a generic perspective, how grouped PDU sessions are seen by the 5GS according to an embodiment of the present invention. Examples of EAI backhaul connectivity that would require an independent DNN for each of them: connection to the public internet; connection to operator-internal services such as AAA, DNS;

connection to service-specific edge deployments (placed on different networks and not directly routable from a given DNN); connection to cloud provider connections (e.g. AWS DirectConnect).

The CN 30 is the entity with visibility of all PDU sessions belonging to a UE. In this context, PDU sessions can be established via different access networks such as, for example, via: 5G-NR and/or WiFi access—i.e. N3IWF, called ePDG in 4G. This has the effect that for a given UE, a given AN is aware of only PDU sessions going through it.

The second embodiment of the disclosure comprising the deployment of the UE edge application as part of the UE layer and being managed by the network, will be explained hereinafter.

FIG. 10 illustrates an EAI managed by the network according to the second embodiment of the disclosure. In FIG. 10, the UE 10 comprises an application 11, an application layer (AL) 12, one or more EAIs 13-1, 13-2, 13-N, and a UE layer (UEL) 10-1. In this case, the EAI layer (EAIL) 13-0 on which the EAI(s) run(s) on or communicates with, e.g. a virtualization layer or container runtime, is managed by the network.

Also in this case, while the AL provides/supports the applications, e.g. as an application runtime or application OS, the UAL provides connectivity, e.g. a UE software stack/modem based on 5G standards. Implementation-wise, no restriction is placed on whether the AL and UEL need to reside on the same physical device and/or run on the same processor.

Figure 11:
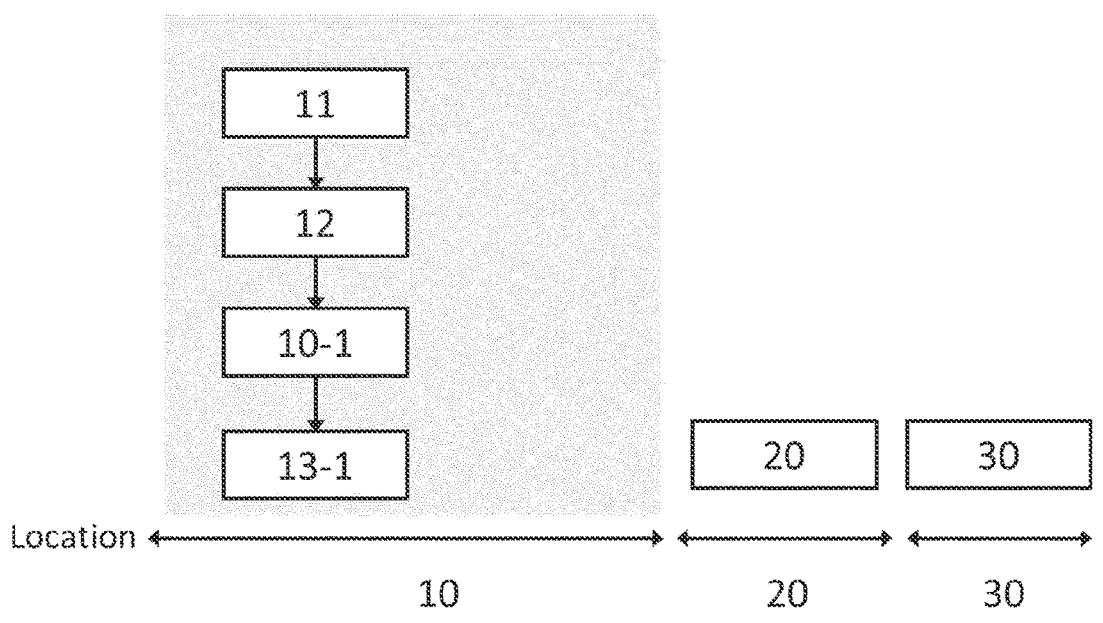
FIG. 11 illustrates the communication flow between an application and an EAI according to an embodiment of the invention.

FIG. 11 illustrates the communication flow between an application 11 and an EAI 13-1 deployed in such a way. In this case, as shown in FIG. 11, an application 11 communicating with the EAI 13-1 sends/receives data packets in the usual way. However, neither the application 11 nor the EAIL 13-0 are aware that said packets are not sent via a PDU session via Uu towards the RAN 20 but rather that they remain in the UE 10.

Similar to the first embodiment, the UE 10 is aware that traffic directed to the EAI's network address (known to the UE) is to be locally redirected to the EAI 13-1 instead of via Uu to the RAN or CN.

Further, the operator's DNS service resolves the EAI's service name to the EAI's network address. In other words, network address management is performed by the CN 30. One method of realizing the network address management is via the use of URSPs, which can be extended to address local resources on the UE instead of just DNN/S-NSSAI or a given PDU session.

In this case, in order to provide backhaul connectivity, after the edge application is deployed, the network managing the deployment triggers the creation of required PDU session(s) to provide the deployed EAIs with network connectivity.

Figure 12:
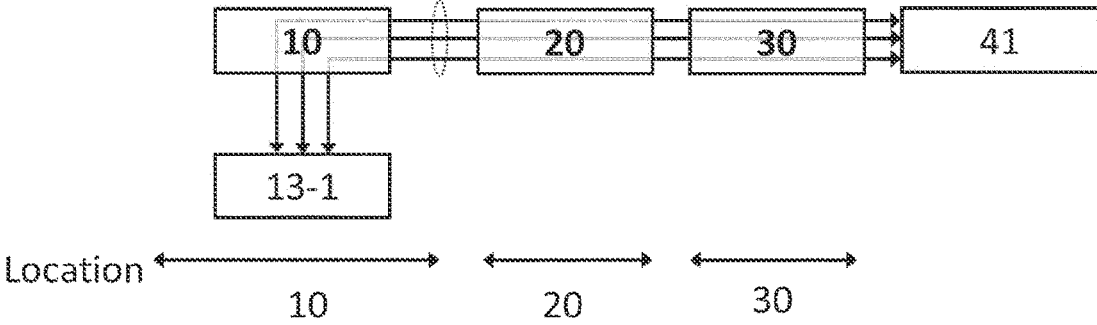
FIG. 12 illustrates an EAI managed by the network according to an embodiment of the invention.

FIG. 12 illustrates an EAI 13-1 deployed on the UE 10 and managed by the network. In FIG. 12, the EAI 13-1 communicates with the EAI backend 41, via the RAN 20 and the CN 30. In this case, the traffic to the EAI remains in the UE 10. Additionally, the UE layer 10-1 forwards traffic towards the EAI 13-1 and not via a PDU session towards RAN 20. Thus, traffic does not go via the Uu interface.

Figure 3:
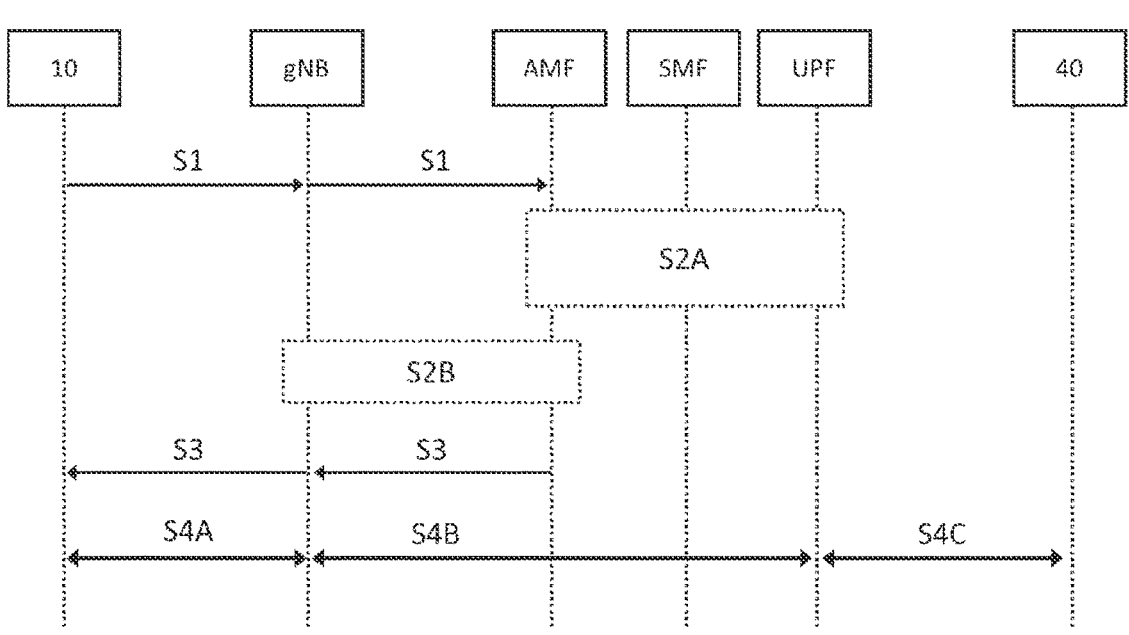
FIG. 3 illustrates an exemplary PDU session establishment process according to the 3GPP.
Figure 4:
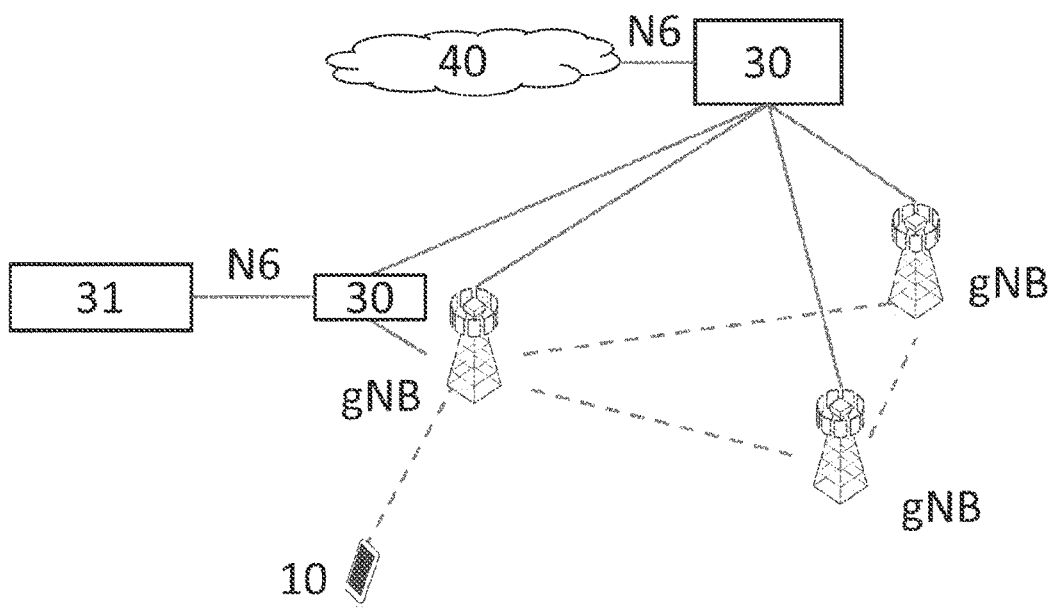
FIG. 4 illustrates an example scenario of an edge application deployment according to the state of the art.
Figure 5:
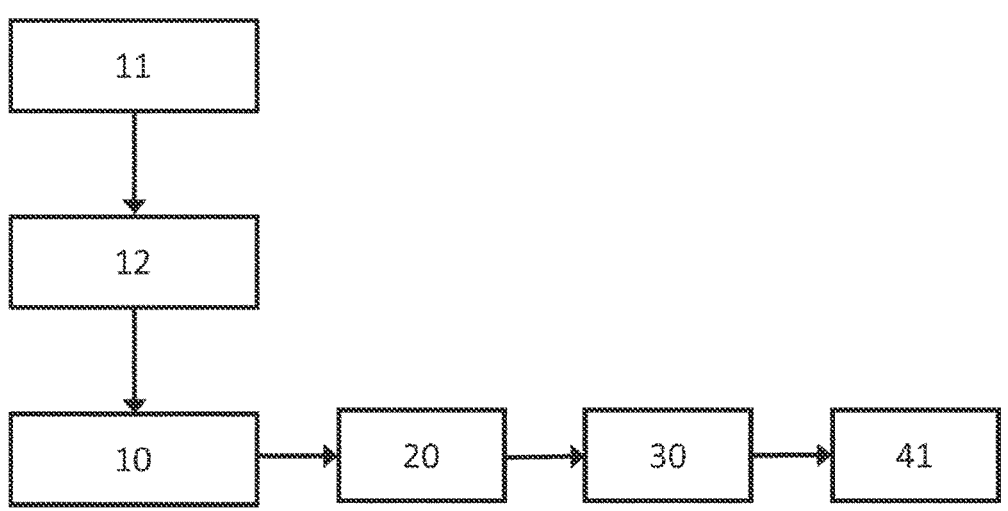
FIG. 5 illustrates an example flow-chart for sending a packet from an application residing at a UE towards a EAS according to the state of the art.

The additions required to the PDU session establishment procedure of FIG. 3 are the following.

Before PDU session establishment, the network sends to the UE 10 a message triggering a PDU session establishment from UE 10 side indicating: a target DNN and/or slice; purpose of the PDU session (for example backhaul); an indication that access to the PDU session by the AL is restricted; and an indication to what EAI it belongs to (different EAIs may run on the UE and they should be separated).

Further, the UE 10 exposes the PDU session to the EAI 13-1 so that the EAI 13-1 can communicate with the EAI backend 41. Here, application data between an application 11 and the EAI 13-1 is redirected by the UE 10 towards the locally-deployed EAI and not a PDU session.

In addition, in order to deploy an EAI, an image is typically downloaded from an image repository located in a DN. Due to the typical size of application images, this is not practicable nor desirable via control plane (CP), so usage of backhaul PDU session(s) by the EAI layer 13-0 is also foreseen.

In the above embodiments, the one or more EAIs 13-1, 13-2, 13-3 and/or EAIL 13-0 may communicate with a EAI application backend 41 via the CN 30 via one or more DNs 40-1, 40-2, 40-3. In this case, the CN 30 sends the UE 10 a trigger message to initiate one or more backhaul PDU session establishments exposed to an EAI 13-1, 13-2, 13-3 and/or EAIL. Alternatively, the CN 30 sends the UE 10 a trigger to use an existing backhaul PDU session.

The CN 30 also provides the EAI and/or connectivity to the EAI backend.

The trigger message may comprise one or more of: data network name (DNN) for the PDU session; slice identifier for the PDU session; credentials to be used for the PDU session establishment; and/or an identifier of the EAI and/or EAIL related to the backhaul PDU session belongs to.

Optionally, the access to the backhaul PDU sessions by the application layer (AL) 12, other applications and/or other EAIs 13-1, 13-2, 13-3 may be restricted by the UEL 10-1.

Optionally, in the case when a backhaul PDU session is used by several EAIs 13-1, 13-2, 13-3, the UEL 10-1 or EAIL 13-0 may direct the data traffic between EAIs 13-1, 13-2, 13-3 using said backhaul PDU session within the UE 10.

Optionally, the CN 30 may manage the network address allocation for EAIs 13-1, 13-2, 13-3 related to a given backhaul PDU session.

Optionally the UE 10 may send to the CN 30, information related to data being exchanged between the application/s 11 and the EAI 13-1, 13-2, 13-3 via a backhaul PDU session.

Optionally, the UE 10 may forward data exchanged between the application(s) 11 and EAIs 13-1, 13-2, 13-3 towards the CN 30 via a backhaul PDU session.

Optionally, the UE registers to the CN 30 via the RAN 20 and informs the CN 30 about the capabilities of its EAIL 13-0.

Optionally, the routing of the packets between the application 11 and the EAIs 13-1, 13-2, 13-3 may be realized by the CN 30 instructing the UE 10 to set a URSP rule to divert traffic directed to the EAI service address and/or service name to a local endpoint referencing the EAI 13-1, 13-2, 13-3 and/or EAIL 13-0 located at the UE.

Optionally, the UE 10 may use an EAI identifier identifying a EAI 13-1, 13-2, 13-3, for establishing a PDU session, to link PDU session/s and a given EAI 13-1, 13-2, 13-3. Further, the UE 10 may indicate, when requesting a PDU session, that the PDU session is used for communication between EAI 13-1, 13-2, 13-3 and EAI backend 41.

Optionally, the EAI 13-1, 13-2, 13-3 and/or EAIL 13-0 may communicate with the EAI backend 41 via the CN 30 via one or more PDU sessions or PDU session endpoints 15.

Optionally, PDU sessions may be used for communication between the one or more EAIs 13-1, 13-2, 13-3 and the EAI backend 41 assigned a group identifier (ID).

Optionally, a priority indication may be used within the PDU session group. The PDU session group ID may be shared by several PDU sessions and may indicate that said PDU sessions need to be treated jointly.

Optionally, the CN may send a PDU session confirmation message to the UE 10. The confirmation message may comprise a priority identifier identifying, within a given PDU session group, the priority of a given PDU session.

According to the invention described above, it is possible to enable the networks to deploy edge functionality at the UE.

Furthermore, the present invention it is possible to enable applications communicate with or via said functionality transparently in the cases where the application is the target of the communication, or where the application is transparent to the traffic. In particular, since transparency is desired, a PDU session to a DNN connecting to a specific application will not be required, but rather the application residing in the UE will only need one or more PDU sessions providing it with a provider and/or tenant networks.

As a further advantage, in the case where an edge application instance (EAI) requires connectivity to external applications, the present invention provides backhaul connectivity and also enables connectivity to more than one DNN and/or slice if required for EAI backhaul purposes.

In addition, based on network triggers, it is possible to deploy edge applications on the UE without the application layer needing to be changed.

For example, one use case that enables the invention would be an application endpoint (i.e. "edge application instance") exchanging communication with a UE-based (directly or indirectly, e.g. another IP device connected via hotspot) application which processes data from the UE, either locally (less probable but possible) or combined with communication with an application backend (e.g. cloud).

As a further example, another use case that enables the invention would be to deploy services offered by the network, which the OS relies on, but being controlled by the network such as: DNS resolving; an API exposure point for interacting with the core network; and/or any kind of network-controlled generic application—in the same way the SIM is a programmable environment, it would provide the network a runtime environment on connected UEs to run applications on.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

Furthermore, in the claims the word "comprising" does not exclude other elements or steps, and the indefinite article "a" or "an" does not exclude a plurality. A single unit may fulfill the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A telecommunications system comprising:
a user equipment (UE);
an access network (AN);
a core network (CN); and
one or more data networks (DNS);
wherein the UE comprises:
    a UE layer (UEL);
    an application layer (AL);
    one or more edge application instances (EAIs);
    an EAI layer (EAIL); and
    an application;
wherein the RAN is configured to provide the UE access to the CN, the CN being configured to provide connectivity to the one or more DNs via protocol data unit (PDU) session(s), each PDU session providing access to a respective DN;
wherein the UEL is configured to direct traffic within a PDU session towards the AL and/or the RAN;
wherein the AL is configured to:
    communicate with the UEL;
    expose a PDU session to the application and/or the EAIL via a PDU session endpoint;
    resolve a service address and/or a service name to the EAIL and/or an EAI; and
    direct traffic from/to a PDU session endpoint to another PDU session endpoint based on the resolved service address and/or service name;
wherein the EAIL is configured to:
    communicate with the AL;
    resolve a service address and/or a service name to an EAI; and
    direct traffic to/from a corresponding EAI based on the resolved service address and/or service name;
wherein the EAIs are configured to communicate with the EAIL; and wherein the application is configured to:

communicate with the AL; and communicate with the service address and/or service name of the EAI.

2. The system of claim 1, wherein the UE is configured to use an EAI identifier identifying an EAI, for establishing a PDU session, to link PDU session(s) and a given EAI;

wherein the UE is configured to indicate when requesting a PDU session that the PDU session is used for communication between EAI and EAI backend; and wherein the AL and the EAIL are located on different physical devices and/or are configured to run on different processors.

3. The system of claim 1, further comprising:

an EAI backend, wherein the EAI and/or EAIL is configured to communicate with the EAI backend via the CN via one or more PDU sessions or PDU session endpoints.

4. The system of claim 1, wherein PDU sessions used for communication between the one or more EAIs and the EAI backend are assigned a group identifier (ID).

5. The system according to claim 4, wherein the PDU session group ID is shared by several PDU sessions and indicates that said PDU sessions need to be treated jointly.

6. The system according to claim 5, wherein the CN is configured to send a PDU session confirmation message to the UE comprising a priority identifier identifying, within a given PDU session group, the priority of a given PDU session.

7. A telecommunications system comprising:

a user equipment (UE);

an access network (AN);

a core network (CN); and one or more data networks (DNS);

wherein the UE comprises:

a UE layer (UEL);

an application layer (AL);

one or more edge application instances (EAIs);

an EAI layer (EAIL); and an application;

wherein: the RAN is configured to provide the UE access to the CN, the CN being configured to provide connectivity to the one or more DNs via protocol data unit (PDU) session(s), each PDU session providing access to a respective DN;

wherein the UEL is configured to:

direct traffic within a PDU session towards the AL and/or the RAN, resolve a service address and/or a service name to the EAIL and/or an EAI; and direct traffic from/to a PDU session endpoint and the EAIL based on the resolved service address and/or service name, wherein the AL is configured to:

communicate with the UEL; and expose a PDU session to the application via another PDU session endpoint;

wherein the EAIL is configured to:

communicate with the UEL;

resolve a service address and/or a service name to the EAI; and direct traffic to/from a corresponding EAI based on the resolved service address and/or service name;

wherein the EAI is configured to communicate with the EAIL; and wherein the application is configured to:

communicate with the AL; and communicate with the service address and/or service name of the EAI.

8. The system of claim 7, further comprising:

an EAI backend, wherein the one or more EAIs and/or EAIL is configured to communicate with the EAI backend via the CN and via one or more DNS;

wherein the CN is configured to:

send the UE a trigger message to initiate one or more backhaul PDU session establishments exposed to an EAI and/or EAIL or, send the UE a trigger to use an existing backhaul PDU session; and provide the EAI and/or connectivity to the EAI backend;

wherein the trigger message comprises one or more of:

a data network name (DNN) for the PDU session;

a slice identifier for the PDU session;

credentials to be used for the PDU session establishment; or an identifier of the EAI and/or EAIL related to the backhaul PDU session.

9. The system of claim 7, wherein an access to the backhaul PDU sessions by the AL, other applications and/or other EAIs is restricted by the UEL.

10. The system of claim 7, wherein in the case when a backhaul PDU session is used by several EAIs:

the UEL or EAIL are configured to direct the data traffic between EAIs using said backhaul PDU session within the UE.

11. The system of claim 7, wherein the CN is configured to manage network address allocation for EAIs related to a given backhaul PDU session.

12. The system of claim 7, wherein the UE is configured to send, to the CN, information related to data being exchanged between the application and the EAI via a backhaul PDU session.

13. The system of claim 7, wherein the UE is configured to forward data exchanged between the application and EAIs towards the CN via a backhaul PDU session.

14. The system of claim 7, wherein the UE is configured to:

register to the CN via the RAN; and inform the CN about the capabilities of its EAIL.

15. The system of claim 7, wherein the routing of the packets between the application and the EAIs is steered by the CN, which is configured to instruct the UE to set a URSP rule to divert traffic directed to the EAI service address and/or service name to a local endpoint referencing the EAI and/or EAIL located at the UE.

16. The system of claim 7, wherein the UE is configured to use an EAI identifier identifying a EAI, for establishing a PDU session, to link PDU session/s and a given EAI;

wherein the UE is configured to indicate when requesting a PDU session that the PDU session is used for communication between EAI and EAI backend; and wherein the AL and the EAIL are located on different physical devices and/or are configured to run on different processors.

17. The system of claim 7, wherein PDU sessions used for communication between the one or more EAIs and the EAI backend are assigned a group identifier (ID).

18. The system of claim 17, wherein the PDU session group ID is shared by several PDU sessions and indicates that said PDU sessions need to be treated jointly.

19. A method for deployment of edge applications in a telecommunications system the method comprising:

provifing, by a radio access network (RAN) to a user equipment (UE), access to a core network (CN), the CN providing connectivity to the one or more data networks (DNS) via protocol data unit (PDU) session(s), each PDU session providing access to a respective DN;

directing, by a UE layer (UEL) of the UE, traffic within a PDU session towards an application layer (AL) of the UE and/or the RAN;

communicating, by the AL, with the UEL;

exposing, by the AL, a PDU session to an application of the UE and/or an edge application instance layer (EAIL) of the UE via a PDU session endpoint;

resolving, by the AL, a service address and/or a service name to the EAIL and/or an edge application instance (EAI);

directing, by the AL, traffic from/to a PDU session endpoint to another PDU session endpoint based on the resolved service address and/or service name;

communicating, by the EAIL, with the AL;

resolving, by the EAIL, a service address and/or a service name to the EAI;

directing, by the EAIL, traffic to/from a corresponding EAI based on the resolved service address and/or service name;

communicating, by the EAIs, with the EAIL, communicating, by the application, with the AL; and communicating, by the application, with the service address and/or service name of the EAI.

20. A method for deployment of edge applications in a telecommunications system, the method comprising:

providing, by a radio access network (RAN), a user equipment (UE) access to a core network (CN), the CN providing connectivity to one or more data networks (DNS) via protocol data unit (PDU) session(s), each PDU session providing access to a respective DN;

directing, by a UE layer (UEL) of the UE, traffic within a PDU session towards an application layer (AL) of the UE and/or the RAN, resolving, by the UEL, a service address and/or a service name to an edge application instance layer (EAIL) of the UE and/or an edge application instance (EAI) of the UE;

directing, by the UEL, traffic from/to a PDU session endpoint and the EAIL based on the resolved service address and/or service name;

communicating, by the AL, with the UEL;

exposing, by the AL, a PDU session to an application via another PDU session endpoint;

communicating, by the EAIL, with the UEL;

resolving, by the EAIL, the service address and/or the service name to the EAI;

directing, by the EAIL, traffic to/from a corresponding EAI based on the resolved service address and/or service name;

communicating, by the EAI, with the EAIL, communicating, by the application, with the AL; and communicating, by the application, with the service address and/or service name of the EAI.

* * * * *